United States Patent
Li et al.

(10) Patent No.: US 8,098,999 B2
(45) Date of Patent: Jan. 17, 2012

(54) MULTIPLE CHANNEL POWER MONITOR

(75) Inventors: Ruolin Li, Santa Clara, CA (US); Anders Grunnet-Jepsen, San Jose, CA (US); John Sweetser, San Jose, CA (US); Ut Tran, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 2678 days.

(21) Appl. No.: 10/465,750

(22) Filed: Jun. 19, 2003

(65) Prior Publication Data

US 2004/0256544 A1    Dec. 23, 2004

(51) Int. Cl.
*H04B 10/00*     (2006.01)
(52) U.S. Cl. ......... 398/197; 398/195; 398/196; 398/182
(58) Field of Classification Search ............... 398/33, 398/34, 79–88, 182–201
See application file for complete search history.

(56) References Cited

U.S. PATENT DOCUMENTS

| 6,084,050 | A  | * | 7/2000 | Ooba et al. ............... 528/42 |
| 6,445,838 | B1 | * | 9/2002 | Caracci et al. ............ 385/14 |
| 6,738,543 | B1 | * | 5/2004 | Beeson et al. ............. 385/27 |
| 2001/0010398 | A1 | * | 8/2001 | Farooq et al. ............ 257/724 |
| 2003/0152385 | A1 | * | 8/2003 | Eldada et al. ............ 398/34 |

* cited by examiner

*Primary Examiner* — Agustin Bello
(74) *Attorney, Agent, or Firm* — Trop, Pruner & Hu, P.C.

(57) ABSTRACT

A tunable filter may be utilized to successively tune to different wavelengths. As each wavelength of the wavelength division multiplexed signal is extracted, it may be successively power monitored. Thus, power monitoring may done without requiring separate power monitors for each channel. This results in considerable advantages in some embodiments, including reduced size, reduced complexities in fabrication, and reduced yield issues in some embodiments.

21 Claims, 2 Drawing Sheets

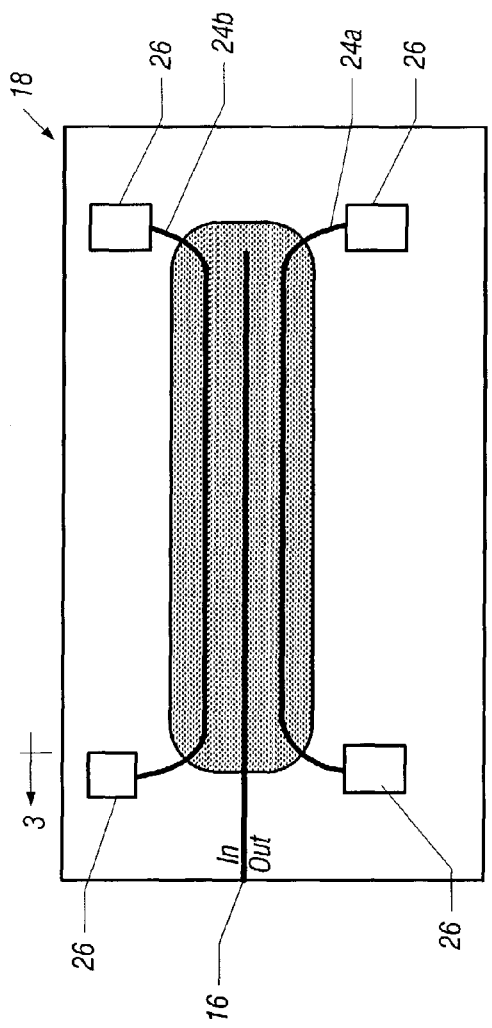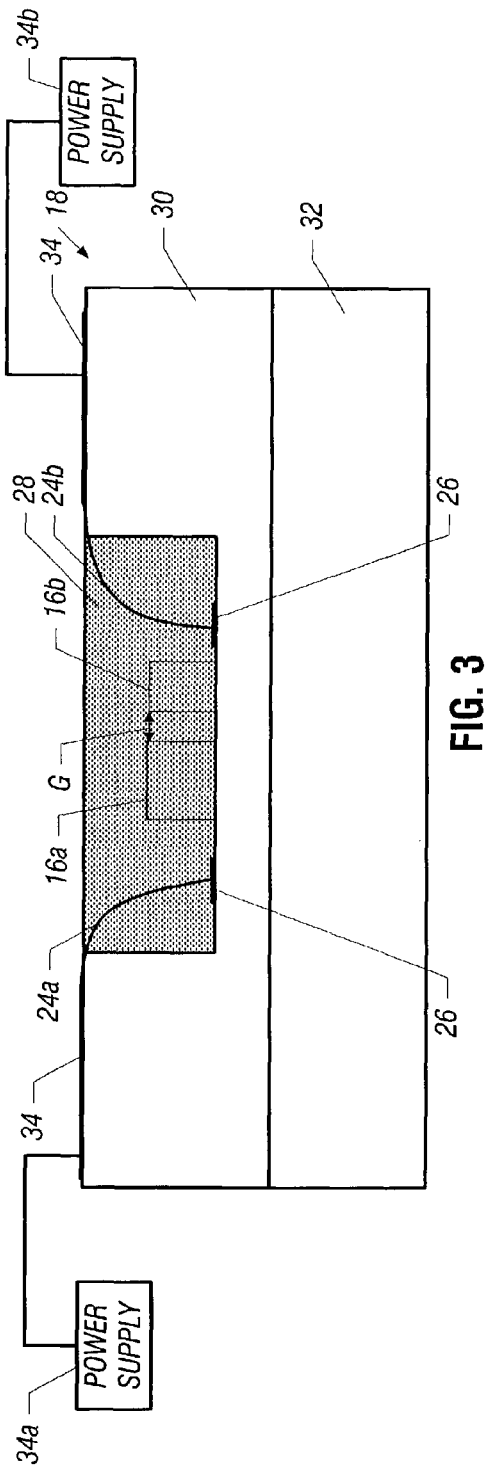

MULTIPLE CHANNEL POWER MONITOR

BACKGROUND

This invention relates generally to power monitors for optical circuits.

In wavelength division multiplexing applications, a number of channels, each of a different wavelength, may be multiplexed over a single optical path, such as a waveguide or fiber. Channel power monitoring becomes increasingly important with more channels because it is necessary to ensure that each channel has sufficient power.

Power monitoring may be done through a free space optical approach where a bulk reflection grating is used to disperse light of different wavelengths for different channels. Alternatively, a planar lightwave circuit approach may be used where each channel is monitored by one tap plus one power monitor after the multiplexer. Although both approaches work well in terms of optical functionality, the former suffers from a large form factor and less integrateability with planar optical devices. The latter poses substantial process and yield challenges since a large number of monitors may be needed for high channel counts, especially in dense wavelength division multiplexing.

Thus, there is a need for better ways to monitor power in an optical wavelength division multiplexed network.

BRIEF DESCRIPTION OF THE DRAWINGS

FIG. 2 is a top plan view of the filter shown in FIG. 1 in accordance with one embodiment of the present invention; and FIG. 3 is an enlarged cross-sectional view taken generally along the line 3-3 in FIG. 2.

DETAILED DESCRIPTION

Figure 1:
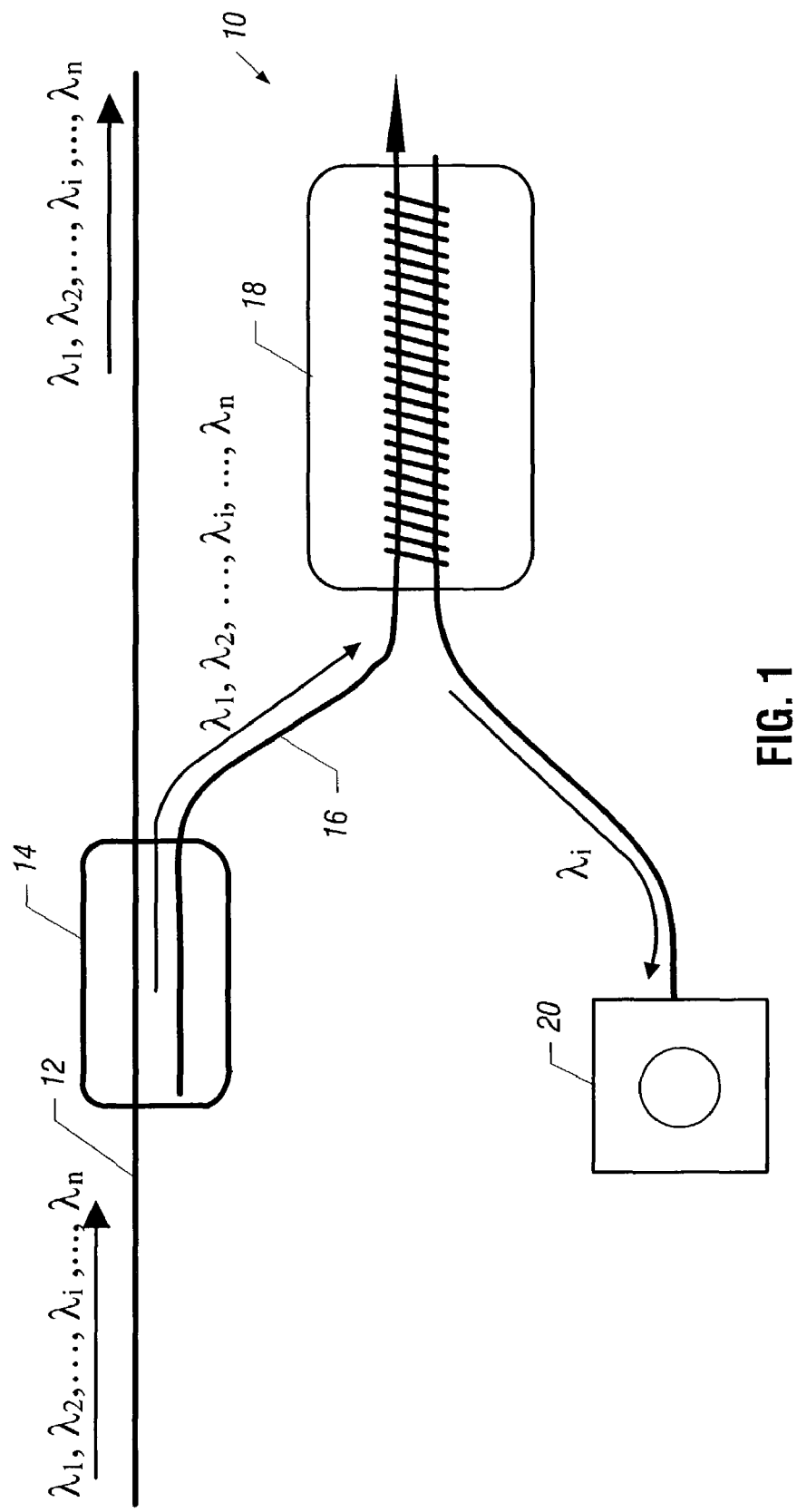
FIG. 1 is a schematic depiction of one embodiment of the present invention.

Referring to FIG. 1, a tunable power monitor circuit 10 may include a channel waveguide 12, a tap coupler 14, a tunable filter 18, and a single power monitor 20 in one embodiment. In one embodiment, a small proportion of the light on the waveguide 12 is tapped out through the tap coupler 14. For example, in one embodiment, five percent of the overall power may be tapped for power monitoring purposes.

The tapped light, which includes all the wavelengths that are multiplexed on the waveguide 12, is sent to a tunable filter 18. The tunable filter 18 selects one channel of one wavelength at a time and couples the selected channel to a power monitor 20 where the channel power is measured.

In this way, the monitor circuit 10 behaves like a fixed wavelength single channel power monitor. However, because the monitor circuit 10 is tunable, the need for a monitor 20 for each channel may be avoided in some embodiments. This makes the monitor 10 smaller, and more integrateable in some applications.

The tunable filter 18 may be implemented in one of a variety of ways, including in the form of a grating coupler, as shown in FIG. 2. By burying the grating coupler in a polymer well 28, and using local heaters 24a and 24b to thermally change the polymer's refractive index, the grating coupler can be made tunable through thermo-optical principles. The change of the polymer's refractive index changes the wavelength of the grating coupler. As a result, different channels are coupled to the power monitor 20 in FIG. 1 for a power measurement. By appropriate design, a wide range of channels can be sequentially scanned over time to the power monitor 20. For example, one channel at a time may be sequentially scanned to the power monitor 20.

Channels may be selected by varying the heat applied to the filter 18 to select a particular channel. The bond pads 26 may be coupled to variable power supplies 34 (FIG. 1) to vary the resistive heating of each heater 24. This enables selection of a desired channel by the thermo-optical effect on refractive index of the well 28.

The filter 18 may be made of two asymmetric single mode waveguide cores 16 or a single twin mode waveguide core, as two examples. In either example, the cores 16 may be made of germanium and silicon dioxide.

Referring to FIG. 3, the gap G between the cores 16a and 16b may be zero in a twin mode embodiment. A tilted reflection grating can be inscribed in either the core 16 or the gap G region for a twin core design or in the waveguide core for a twin mode design. In both cases, the two cores 16 of the coupler may be asymmetric. Local heaters 24a and 24b of low power consumption may be introduced for changing the temperature of the polymer well 28 and, therefore, its refractive index. The heaters 24 may be coupled through bond pads 26 and metallization 34 to one of the power supplies 34 of FIG. 1.

The power monitor 20 may be made through trenching and flip-chip bonding processes in one embodiment. For example, an angular trench may be made which reflects light from a waveguide upwardly to an overlying photodetector flip-chip bonded to the trenched substrate. The reflective trench may be formed by etching at an angle and covering the angled, etched surface with a reflective material.

In accordance with other embodiments of the present invention, the tunable filter 18 may be a Mach-Zehnder interferometer-based coupler, a phase-shifted long period grating coupler, or a grating assisted ring-like coupler, to mention a few examples. A thermo-optic tuning mechanism may, for example, be used with a local heating scheme and each application may be similar to that described above.

As a result, a large number of monitors are not needed, reducing the process and yield challenges in some embodiments. This may reduce the size of the power monitor and make it more amenable to planar optical devices. Thus, in some embodiments, the filter 18 may be formed on a planar light circuit having a cladding 30 and a semiconductor substrate 32. In one embodiment the cladding 30 may be silica and the substrate 32 may be silicon.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An optical power monitor circuit comprising:
    a tunable filter to select one channel from a wavelength division multiplexed signal, wherein said filter includes a polymer well and a controllable heater to controllably heat the well; and
    a power monitor to monitor the power of the selected channel.

2. The circuit of claim 1 including a single power monitor to monitor the power of a plurality of wavelengths.

3. The circuit of claim 1 wherein said tunable filter includes a thermo-optically tunable filter.

4. The circuit of claim 1 including at least two heaters to heat said well.

5. The circuit of claim 4 including a power supply for said heaters to enable the heat generated by said heaters to be variably controlled to select a desired channel by the thermo-optic effect.

6. The circuit of claim 1 including a pair of cores in said polymer well.

7. The circuit of claim 1 including a single core in said polymer well.

8. The circuit of claim 1 wherein said tunable filter is a twin mode waveguide core filter.

9. The circuit of claim 1 wherein said tunable filter is a single mode waveguide core tunable filter.

10. The circuit of claim 1 wherein said tunable filter is a grating coupler.

11. The circuit of claim 1 including a tap coupler coupled to a waveguide and to said tunable filter.

12. The circuit of claim 1 wherein said circuit is a planar lightwave circuit.

13. A method comprising:
    tapping a portion of the power of an optical waveguide;
    selectively filtering one of the channels of a wavelength division multiplexed signal tapped from said waveguide;
    monitoring the power of the selected channel;
    using the thermo-optic effect to tune said filter to select the desired channel; and
    controllably heating a polymer well included in said filter using two heaters to adjust the refractive index of said polymer well.

14. The method of claim 13 including providing a twin mode waveguide core filter.

15. The method of claim 13 including providing a single mode waveguide core tunable filter.

16. The method of claim 13 including providing only a single power monitor to monitor the power of a plurality of channels of different wavelengths.

17. The method of claim 13 including using a grating coupler as said tunable filter.

18. An optical power monitor circuit comprising:
    a thermo-optically tunable filter to select one channel from a wavelength division multiplexed signal;
    a power monitor to monitor the power of a sequentially selected channel; and
    wherein said filter includes a polymer well and a controllable heater to controllably heat the well.

19. The circuit of claim 18 including at least two heaters to heat said well.

20. The circuit of claim 18 including a pair of cores in said polymer well.

21. The method of claim 18 including controllably heating a polymer well included in said filter using two heaters to adjust the refractive index of said polymer well.

* * * * *